US011313955B1

(12) United States Patent
Viswanatha et al.

(10) Patent No.: US 11,313,955 B1
(45) Date of Patent: Apr. 26, 2022

(54) TECHNIQUES TO ASSOCIATE PEAKS IN MULTI-TARGET SCENARIOS IN COHERENT LIDAR SYSTEMS

(71) Applicant: AEVA, INC., Mountain View, CA (US)

(72) Inventors: Kumar Bhargav Viswanatha, Santa Clara, CA (US); Jose Krause Perin, Mountain View, CA (US); Rajendra Tushar Moorti, Mountain View, CA (US); Mina Rezk, Haymarket, VA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 17/339,763

(22) Filed: Jun. 4, 2021

Related U.S. Application Data

(60) Provisional application No. 63/104,372, filed on Oct. 22, 2020.

(51) Int. Cl.
| | | |
|---|---|---|
| *G01S 7/481* | (2006.01) | |
| *G01S 7/4912* | (2020.01) | |
| *G01S 17/89* | (2020.01) | |
| *G01S 17/931* | (2020.01) | |

(52) U.S. Cl.
CPC .......... *G01S 7/4817* (2013.01); *G01S 7/4912* (2013.01); *G01S 17/89* (2013.01); *G01S 17/931* (2020.01)

(58) Field of Classification Search
CPC .... G01S 7/4817; G01S 17/931; G01S 7/4912; G01S 17/89; G01S 17/894; G01S 17/58; G01S 7/491; G01S 7/493; G01S 17/34; G01S 17/26; G01S 7/4911
See application file for complete search history.

(56) References Cited

U.S. PATENT DOCUMENTS

2003/0117312 A1 6/2003 Nakanishi et al.
2019/0310372 A1* 10/2019 Crouch .................. G01S 17/89

FOREIGN PATENT DOCUMENTS

JP 11316273 A 11/1999
JP 3060792 B2 7/2000

OTHER PUBLICATIONS

International Search Report and Written Opinion on the Patentability of Application No. PCT/US2021/055235 dated Jan. 28, 2022, 14 pages.

* cited by examiner

*Primary Examiner* — Luke D Ratcliffe
(74) *Attorney, Agent, or Firm* — Womble Bond Dickinson (US) LLP

(57) ABSTRACT

A method includes transmitting one or more optical beams, each optical beam including different frequency chirps towards targets in a field of view of a light detection and ranging (LIDAR) system, receiving return signals based on reflections from the targets, each return signal including a different frequency, and generating a baseband signal in a frequency domain based on the return signals, the baseband signal including a first set of peaks each associated with a different up-chirp frequency and a second set of peaks each associated with a different down-chirp frequency. The method further includes generating one or more metrics associated with each of the first set of peaks and each of the second set of peaks and identifying the targets based on a pairing of each peak of the first set of peaks with a peak of the second set of peaks using the one or more metrics.

19 Claims, 11 Drawing Sheets

TECHNIQUES TO ASSOCIATE PEAKS IN MULTI-TARGET SCENARIOS IN COHERENT LIDAR SYSTEMS

RELATED APPLICATIONS

This application claims priority from and the benefit of U.S. Provisional Patent Application No. 63/104,372 filed on Oct. 22, 2020, the entire contents of which are incorporated herein by reference in their entirety.

FIELD

The present disclosure is related to light detection and ranging (LIDAR) systems in general, and more particularly to peak association of multi-target scenarios in coherent LIDAR systems.

BACKGROUND

Frequency-Modulated Continuous-Wave (FMCW) LIDAR systems use tunable, infrared lasers for frequency-chirped illumination of targets, and coherent receivers for detection of backscattered or reflected light from the targets that are combined with a local copy of the transmitted signal. Mixing the local copy with the return signal, delayed by the round-trip time to the target and back, generates signals at the receiver with frequencies that are proportional to the distance to each target in the field of view of the system. An up sweep of frequency and a down sweep of frequency may be used to detect a range and velocity of a detected target. However, when a scene includes multiple targets, the issue of associating the peaks corresponding to each target arises.

SUMMARY

The present disclosure describes examples of systems and methods for associating peaks in multi-target scenarios in a LIDAR system.

In one embodiment, a method includes transmitting optical beams including different frequency chirps towards targets in a field of view of a light detection and ranging (LIDAR) system and receiving return signals based on reflections from the targets, wherein each return signal includes a different frequency. The method further includes generating a baseband signal in a frequency domain based on the return signals, the baseband signal including a first set of peaks each associated with a different up-chirp frequency and a second set of peaks each associated with a different down-chirp frequency. The method includes generating one or more metrics associated with each of the first set of peaks and each of the second set of peaks and identifying the targets based on a pairing of each peak of the first set of peaks with a peak of the second set of peaks using the one or metrics.

In some embodiments, the one or more metrics include similar computed peak shapes between each peak of the first set of peaks and the second set of peaks. In some embodiments, the similar computed peak shapes include a correlator output for each of the first set of peaks compared with each of the second set of peaks. In some embodiments, the one or more metrics further include at least one of peak intensity, peak width, ego-velocity, and raw peak frequencies.

In some embodiments, the method includes combining the one or more metrics for each the first set of peaks and the second set of peaks into a combined metric and identifying the targets based on the combined metric for each of the first set of peaks and the second set of peaks. In some embodiments, combining the one or more metrics into a combined metric includes weighting each of the one or more metrics to generate weighted metrics and summing one or more of the weighted metrics to generate a weighted sum of the one or more metrics.

In some embodiments, identifying the targets includes performing an optimization algorithm to minimize a cost function associated with the pairing of each of the first set of peaks and the second set of peaks, the cost function corresponding to a sum of the one or more metrics for the pairing of each of the first set of peaks and the second set of peaks.

In some embodiments, the method further includes identifying neighboring data points of each of the first set of peaks and the second set of peaks and identifying the targets further based on the neighboring data points of each of the first set of peaks and the second set of peaks.

In some embodiments, each of the neighboring data points includes one or more of data points neighboring each of the first set of peaks and the second set of peaks in an azimuthal space, an elevation space, a three-dimensional space, or in a temporal space. In some embodiments, determining that a first number of peaks in the first set of peaks is different from a second number of peaks in the second set of peaks and, in response to determining that the first number of peaks does not match the second number of peaks, identifying the targets based on an extra peak being detected by either the up-chirp frequencies or the down-chirp frequencies, or identifying the targets based on a missed detection of either the up-chirp frequencies or the down-chirp frequencies.

In one embodiment, a light detection and ranging (LIDAR) system includes an optical scanner to transmit optical beams each including different frequency chirps toward targets in a field of view of the LIDAR system and receive return signals from reflections of optical beams from the targets wherein each return signal from the return signals includes a different frequency. The LIDAR system further includes an optical processing system coupled to the optical scanner to generate an electrical signal from the return signals, the electrical signal including frequencies corresponding to LIDAR target ranges and a signal processing system coupled to the optical processing system. The signal processing system includes a processing device and a memory to store instructions that, when executed by the processing device, cause the LIDAR system to generate a baseband signal in a frequency domain based on the electrical signal generated from the return signals, the baseband signal including a first set of peaks each associated with a different up-chirp frequency and a second set of peaks each associated with a different down-chirp frequency. The instructions further cause the processing device to generate one or more metrics associated with each of the first set of peaks and each of the second set of peaks of the baseband signal and identify the targets based on a pairing of each peak of the first set of peaks with a peak of the second set of peaks or the baseband signal using the one or metrics.

In one embodiment, a LIDAR system includes an optical scanner to transmit optical beams each including different frequency chirps toward one or more targets in a field of view of the LIDAR system and receive return signals from reflections of the optical beams from the one or more targets, wherein each return signal from the return signals includes a different frequency. The LIDAR system further includes an optical processing system coupled to the optical scanner to generate an electrical signal from the return signals, the electrical signal including frequencies corresponding to LIDAR target ranges, and a signal processing system coupled to the optical processing system. The signal processing system includes a processing device and a memory to store instructions that, when executed by the processing device, cause the LIDAR system to identify a first set of peaks of the electrical signal, each peak of the first set of peaks being associated with a different up-chirp frequency, and a second set of peaks of the electrical signal, each peak of the second set of peaks being associated with a different down-chirp frequency. The instructions further cause the processing device to determine one or more peak metrics for each of the first set of peaks and the second set of peaks, generate peak pairs by associating each peak of the first set of peaks with a peak of the second set of peaks based on the one or more peak metrics, and identify the one or more targets based on the peak pairs.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

The present disclosure describes various examples of LIDAR systems and methods for associating peaks in multi-target scenarios in a LIDAR system. According to some embodiments, the described LIDAR system may be implemented in any sensing market, such as, but not limited to, transportation, manufacturing, metrology, medical, virtual reality, augmented reality, and security systems. According to some embodiments, the described LIDAR system can be implemented as part of a front-end of frequency modulated continuous-wave (FMCW) device that assists with spatial awareness for automated driver assist systems, or self-driving vehicles.

LIDAR systems described by the embodiments herein include coherent scan technology to detect a signal returned from a target to generate a coherent heterodyne signal, from which range and velocity information of the target may be extracted. A signal, or multiple signals, may include an up-sweep of frequency (up-chirp) and a down-sweep of frequency (down-chirp), either from a single optical source or from separate optical source (i.e., one source with an up-sweep and one source with a down-sweep). Accordingly, two different frequency peaks, one for the up-chirp and one for the down-chirp, may be associated with a target and can be used to determine target range and velocity. In a scene with multiple targets, there may be several frequency peak pairs that are to be associated together; one pair for each target. However, since there may be many possible peak pair combinations generated from a multiple target scene, it can be difficult to optimally associate the correct peak pairs together. Using the techniques described herein, embodiments of the present invention can, among other things, address the issues described above by generating metrics for each of the peaks and possible peak pairs and performing an association algorithm based on the generated metrics. Several metrics for each peak and possible peak pair may be combined for performing the association algorithm. Accordingly, using several metrics generated for each of the possible peak pairs, the peaks pairs can be optimally associated together.

Figure 1:
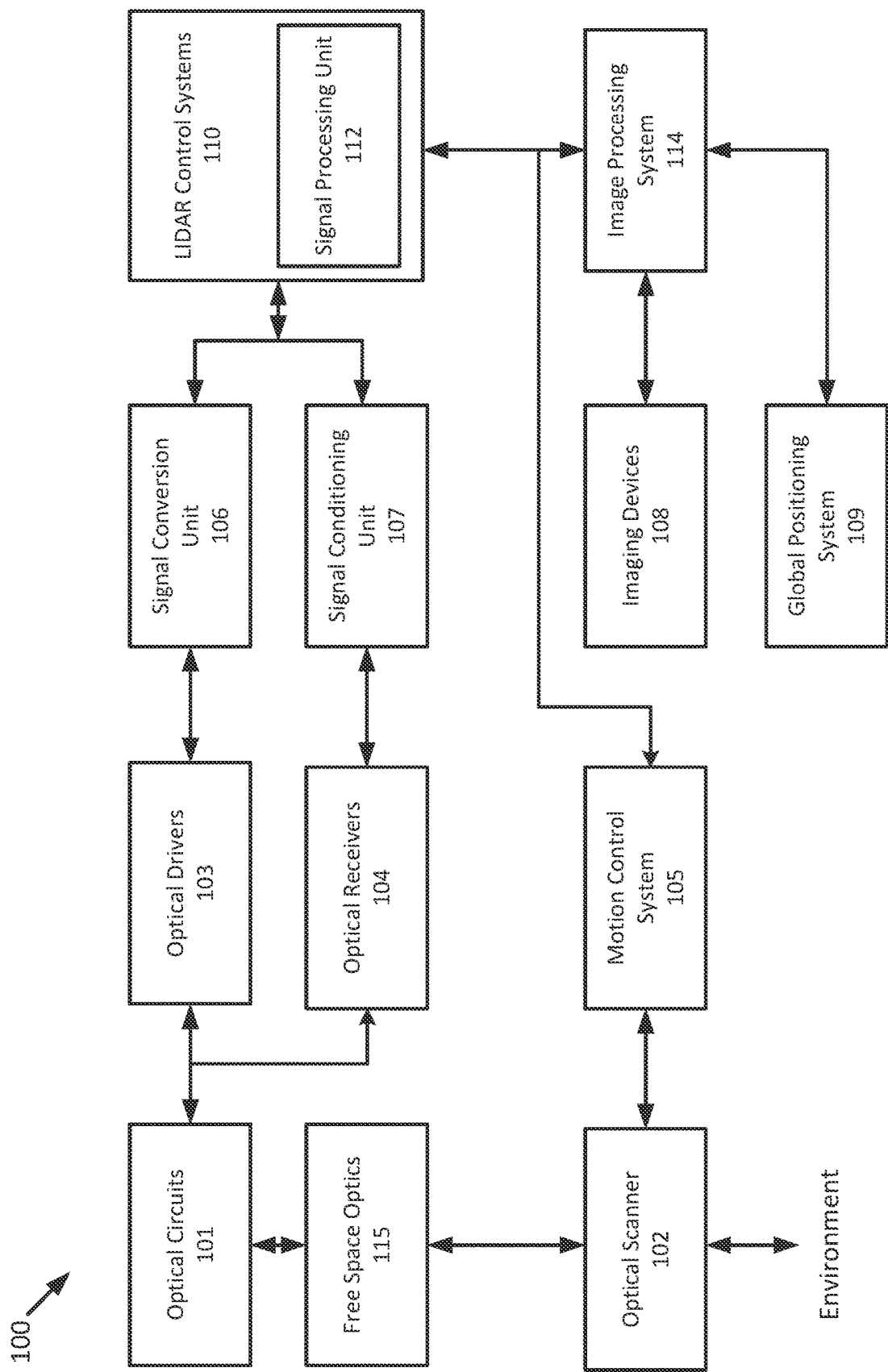
FIG. 1 is a block diagram illustrating an example LIDAR system according to the present disclosure.

FIG. 1 illustrates a LIDAR system 100 according to example implementations of the present disclosure. The LIDAR system 100 includes one or more of each of a number of components, but may include fewer or additional components than shown in FIG. 1. One or more of the components depicted in FIG. 1 can be implemented on a photonics chip, according to some embodiments. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers, non-reciprocal elements such as Faraday rotator or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. The optical scanner 102 also collects light incident upon any objects in the environment into a return optical beam that is returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device such as signal processing unit 112. In some examples, signal processing unit 112 may be one or more general-purpose processing devices such as a microprocessor, central processing unit, or the like. More particularly, signal processing unit 112 may be complex instruction set computing (CISC) microprocessor, reduced instruction set computer (RISC) microprocessor, very long instruction word (VLIW) microprocessor, or processor implementing other instruction sets, or processors implementing a combination of instruction sets. Signal processing unit 112 may also be one or more special-purpose processing devices such as an application specific integrated circuit (ASIC), a field programmable gate array (FPGA), a digital signal processor (DSP), network processor, or the like.

In some examples, signal processing unit 112 is a digital signal processor (DSP). The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
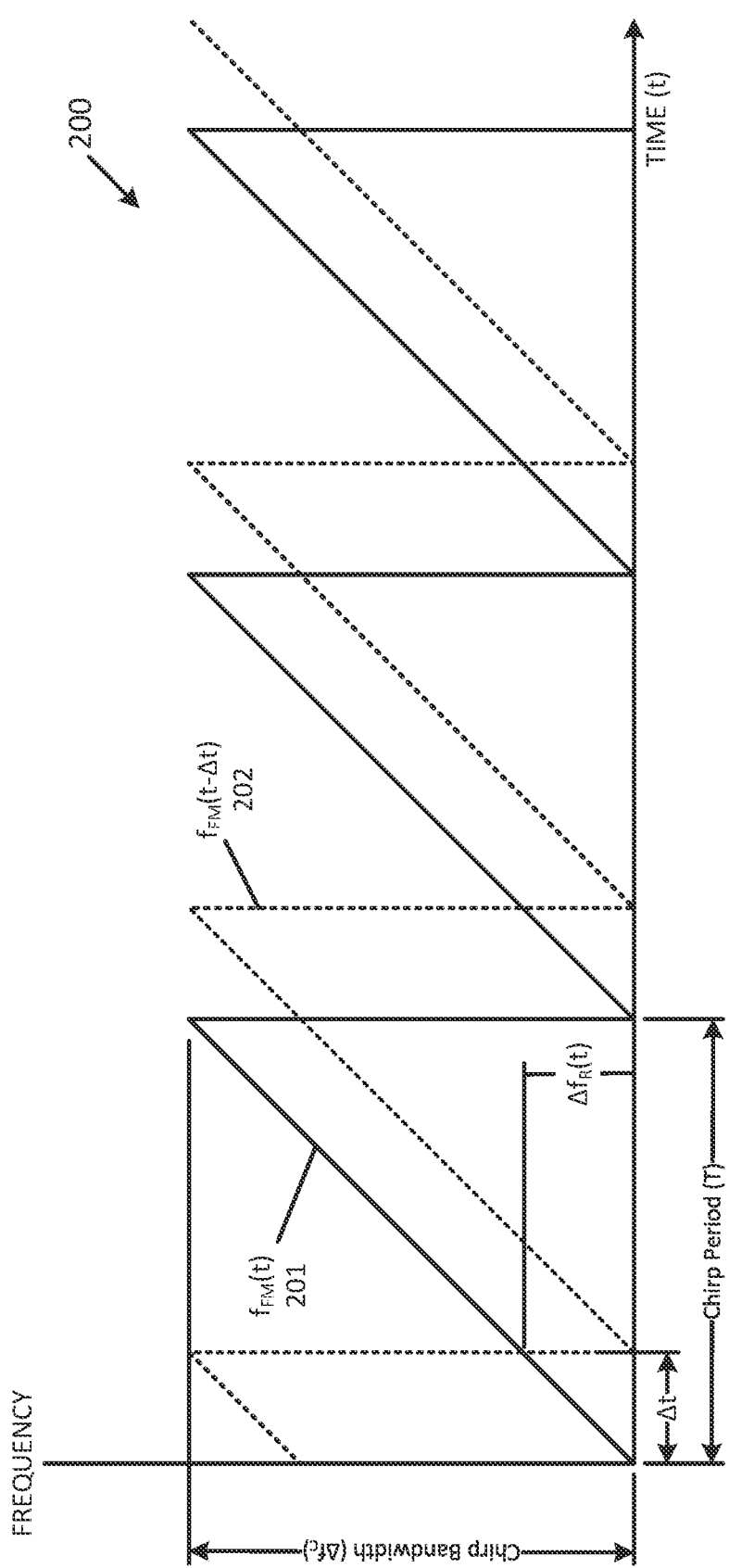
FIG. 2 is a time-frequency diagram illustrating one example of LIDAR waveforms according to the present disclosure.

FIG. 2 is a time-frequency diagram 200 of an FMCW scanning signal 201 that can be used by a LIDAR system, such as system 100, to scan a target environment according to some embodiments. In one example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner. It should be noted that while embodiments of the present disclosure may be used in conjunction with FMCW LiDAR, the disclosure is not limited to FMCW LiDAR and embodiments may be used with any other form of coherent LiDAR as well.

Figure 3A:
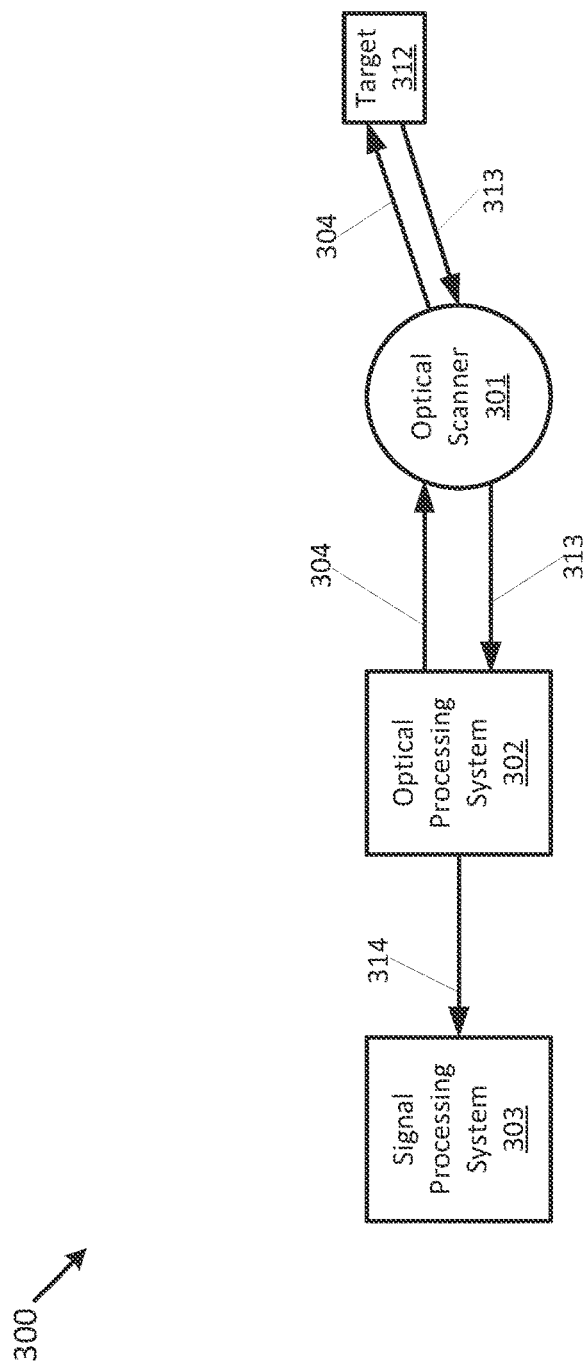
FIG. 3A is a block diagram illustrating an example LIDAR system according to the present disclosure.

FIG. 3A is a block diagram illustrating an example FMCW LIDAR system 300 according to the present disclosure. Example system 300 includes an optical scanner 301 to transmit an FMCW (frequency-modulated continuous wave) infrared (IR) optical beam 304 and to receive a return signal 313 from reflections of the optical beam 304 from targets such as target 312 in the field of view (FOV) of the optical scanner 301. System 300 also includes an optical processing system 302 to generate a baseband signal 314 in the time domain from the return signal 313, where the baseband signal 314 contains frequencies corresponding to LIDAR target ranges. Optical processing system 302 may include elements of free space optics 115, optical circuits 101, optical drivers 103 and optical receivers 104 in LIDAR system 100. System 300 also includes a signal processing system 303 to measure energy of the baseband signal 314 in the frequency domain, to compare the energy to an estimate of LIDAR system noise, and to determine a likelihood that a signal peak in the frequency domain indicates a detected target. Signal processing system 303 may include elements of signal conversion unit 106, signal conditioning unit 107, LIDAR control systems 110 and signal processing unit 112 in LIDAR system 100.

Figure 3B:
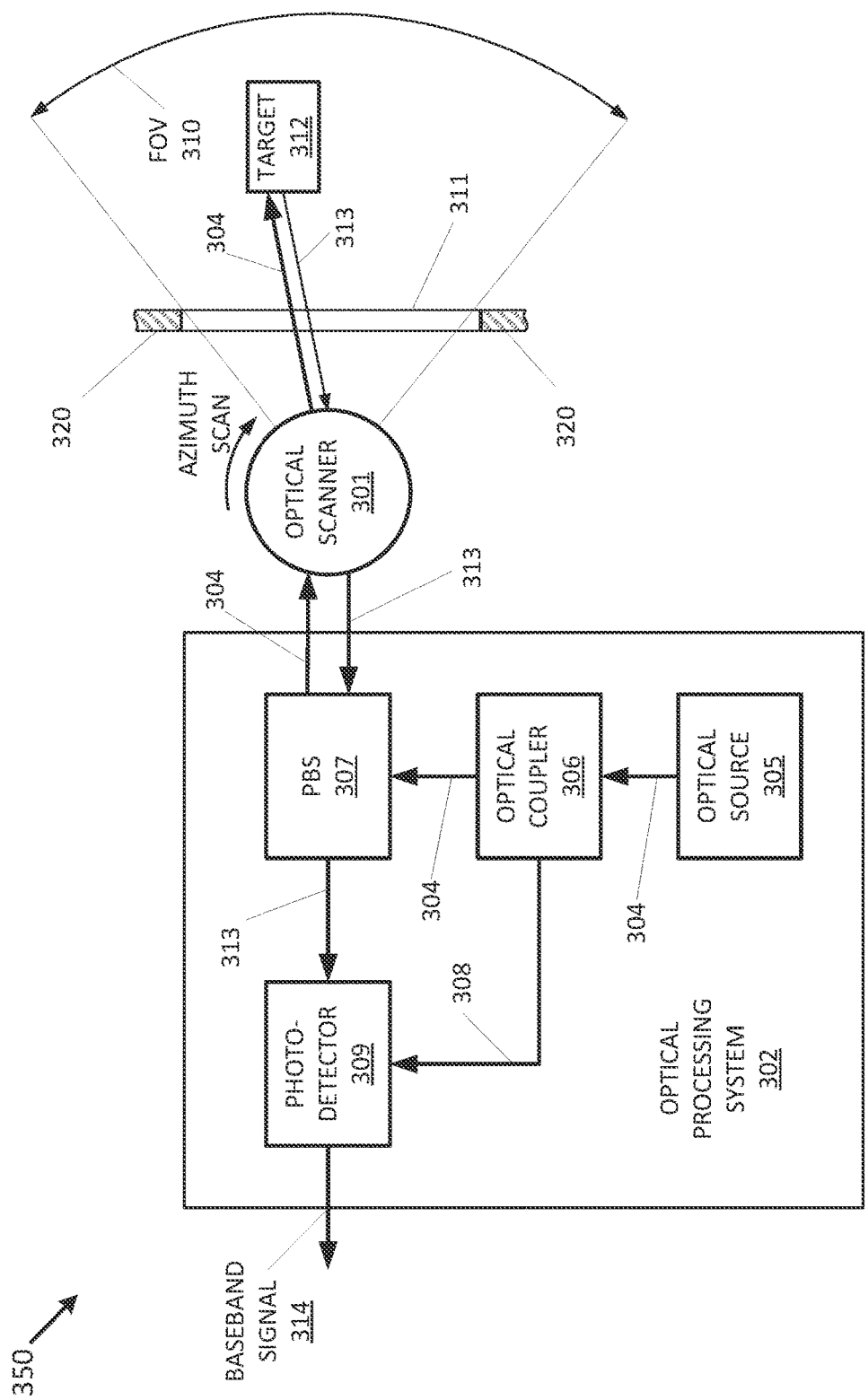
FIG. 3B is a block diagram illustrating an electro-optical optical system according to the present disclosure.

FIG. 3B is a block diagram illustrating an example electro-optical system 350. Electro-optical system 350 includes the optical scanner 301, similar to the optical scanner 102 illustrated and described in relation to FIG. 1. Electro-optical system 350 also includes the optical processing system 302, which as noted above, may include elements of free space optics 115, optical circuits 101, optical drivers 103, and optical receivers 104 in LIDAR system 100.

Electro-optical processing system 302 includes an optical source 305 to generate the frequency-modulated continuous-wave (FMCW) optical beam 304. The optical beam 304 may be directed to an optical coupler 306 that is configured to couple the optical beam 304 to a polarization beam splitter (PBS) 307 and a sample 308 of the optical beam 304 to a photodetector (PD) 309. The PBS 307 is configured to direct the optical beam 304, because of its polarization, toward the optical scanner 301. Optical scanner 301 is configured to scan a target environment with the optical beam 304, through a range of azimuth and elevation angles covering the field of view (FOV) 310 of a LIDAR window 311 in an enclosure 320 of the optical system 350. In FIG. 3B, for ease of illustration, only the azimuth scan is illustrated.

As shown in FIG. 3B, at one azimuth angle (or range of angles), the optical beam 304 passes through the LIDAR widow 311 and illuminates a target 312. A return signal 313 from the target 312 passes through LIDAR window 311 and is directed by optical scanner 301 back to the PBS 307.

The return signal 313, which will have a different polarization than the optical beam 304 due to reflection from the target 312, is directed by the PBS 307 to the photodetector (PD) 309. In PD 309, the return signal 313 is optically mixed with the local sample 308 of the optical beam 304 to generate a range-dependent baseband signal 314 in the time domain. The range-dependent baseband signal 314 is the frequency difference between the local sample 308 of the optical beam 304 and the return signal 313 versus time (i.e., $\Delta f_R(t)$).

Figure 4:
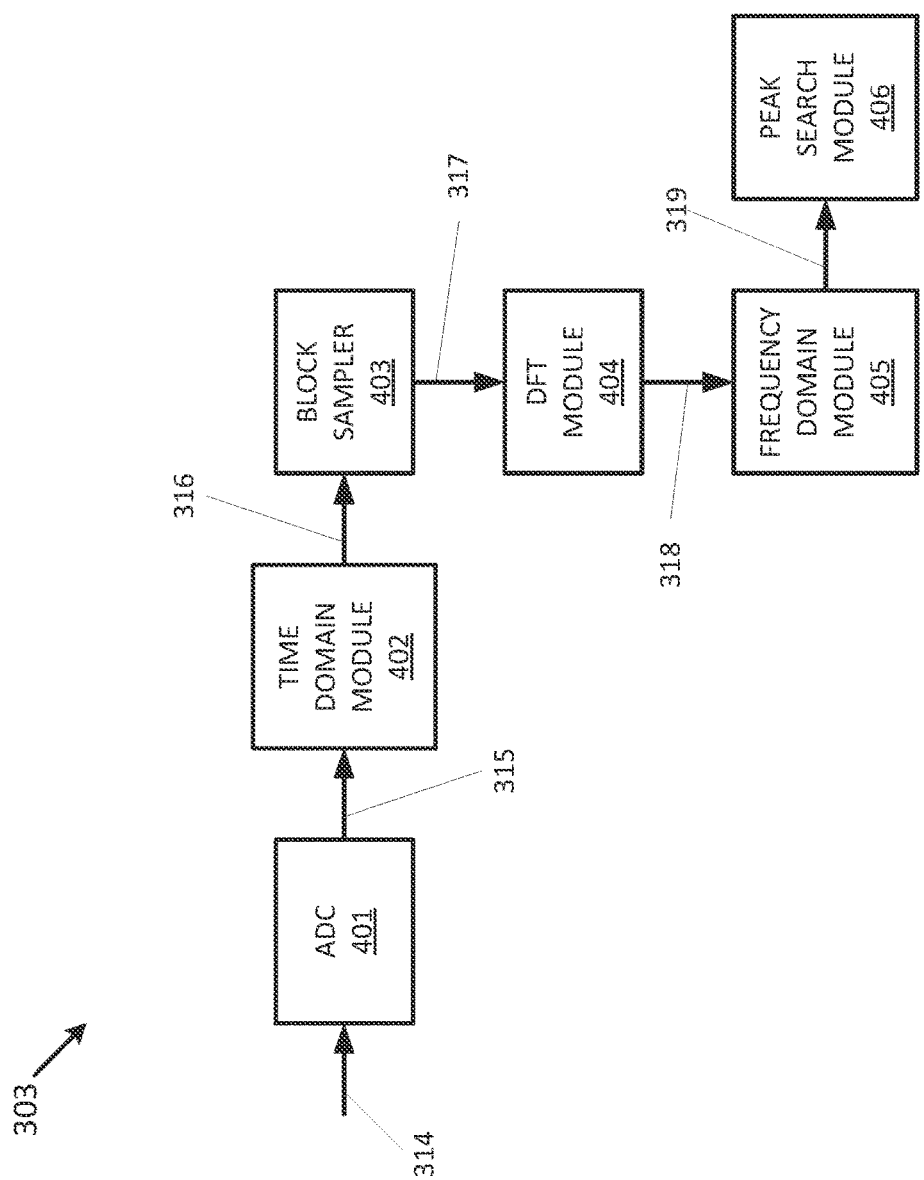
FIG. 4 is a block diagram of an example signal processing system according to the present disclosure.

FIG. 4 is a detailed block diagram illustrating an example of the signal processing system 303, which processes the baseband signal 314 according to some embodiments. As noted above, signal processing unit 303 may include elements of signal conversion unit 106, signal conditioning unit 107, LIDAR control systems 110 and signal processing unit 112 in LIDAR system 100.

Signal processing system 303 includes an analog-to-digital converter (ADC) 401, a time domain signal module 402, a block sampler 403, a discrete Fourier transform (DFT) module 404, a frequency domain signal module 405, and a peak search module 406. The component blocks of signal processing system 303 may be implemented in hardware, firmware, software, or some combination of hardware, firmware and software.

In FIG. 4, the baseband signal 314, which is a continuous analog signal in the time domain, is sampled by ADC 401 to generate a series of time domain samples 315. The time domain samples 315 are processed by the time domain module 402, which conditions the time domain samples 315 for further processing. For example, time domain module 402 may apply weighting or filtering to remove unwanted signal artifacts or to render the signal more tractable for subsequent processing. The output 316 of time domain module 402 is provided to block sampler 403. Block sampler 403 groups the time domain samples 316 into groups of N samples 317 (where N is an integer greater than 1), which are provided to DFT module 404. DFT module 404 transforms the groups of N time domain samples 317 into N frequency bins or subbands 318 in the frequency domain, covering the bandwidth of the baseband signal 314. The N subbands 319 are provided to frequency domain module 405, which conditions the subbands for further processing. For example, frequency domain module 405 may resample and/or average the subbands 319 for noise reduction. Frequency domain module 405 may also calculate signal statistics and system noise statistics. The processed subbands 319 are then provided to a peak search module 406 that searches for signal peaks representing detected targets in the FOV of the LIDAR system 300.

Figure 5:
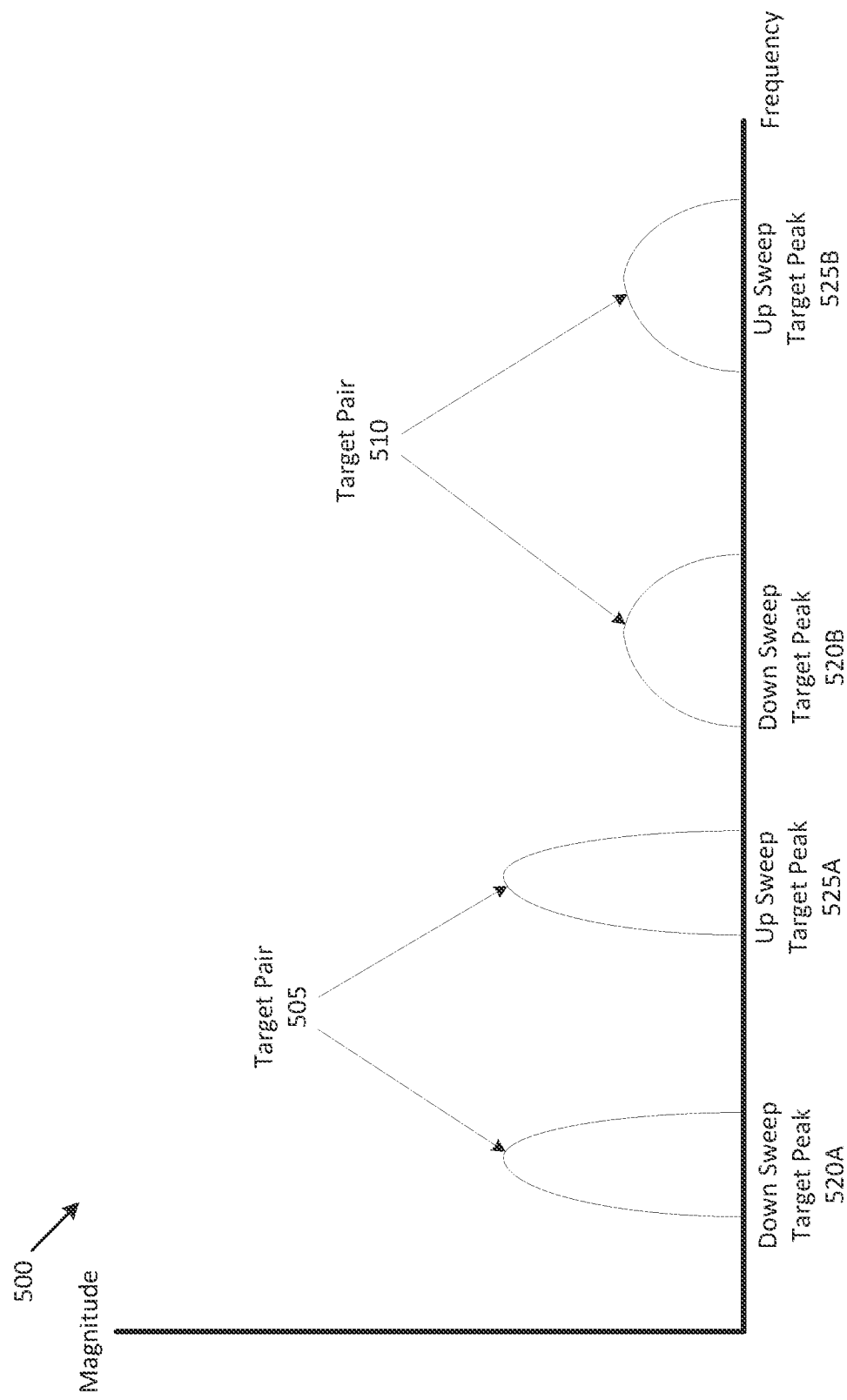
FIG. 5 is a signal magnitude-frequency diagram illustrating signal peaks for multiple targets according to the present disclosure.

FIG. 5 is an example of a signal magnitude-frequency diagram 500 illustrating signal peaks for multiple targets according to some embodiments. In some embodiments, an FMCW LIDAR system may generate an up-chirp and a down-chirp frequency modulation (also referred to herein as "up-sweep" and "down-sweep", respectively) to scan a target environment and to determine range and velocity of targets within that environment. In one example, a single optical source may generate both the up-chirp and the down-chirp. In another example, the system may include an optical source to generate an optical beam that includes the up-chirp and a different optical source to generate an optical beam that includes the down-chirp. Using the returned signal and corresponding generated beat frequencies (i.e., peak frequencies) from the up-chirp and down-chirp, a signal processing system (e.g., signal processing unit 112 of FIG. 1 and signal processing system 303) can determine both a range of a target and a velocity of the target. In some embodiments, to determine the range of the target (i.e., distance from the LIDAR system), the signal processing unit 112 may sum the two frequencies of the two peaks and then divide the sum by two. In some embodiments, to determine the velocity of the target, the signal processing unit 112 may divide the difference between the two peak frequencies by two. In some scenarios, as depicted in FIG. 5, there may arise situations in which multiple targets are in a scene resulting in multiple peak pairs.

Figure 6:
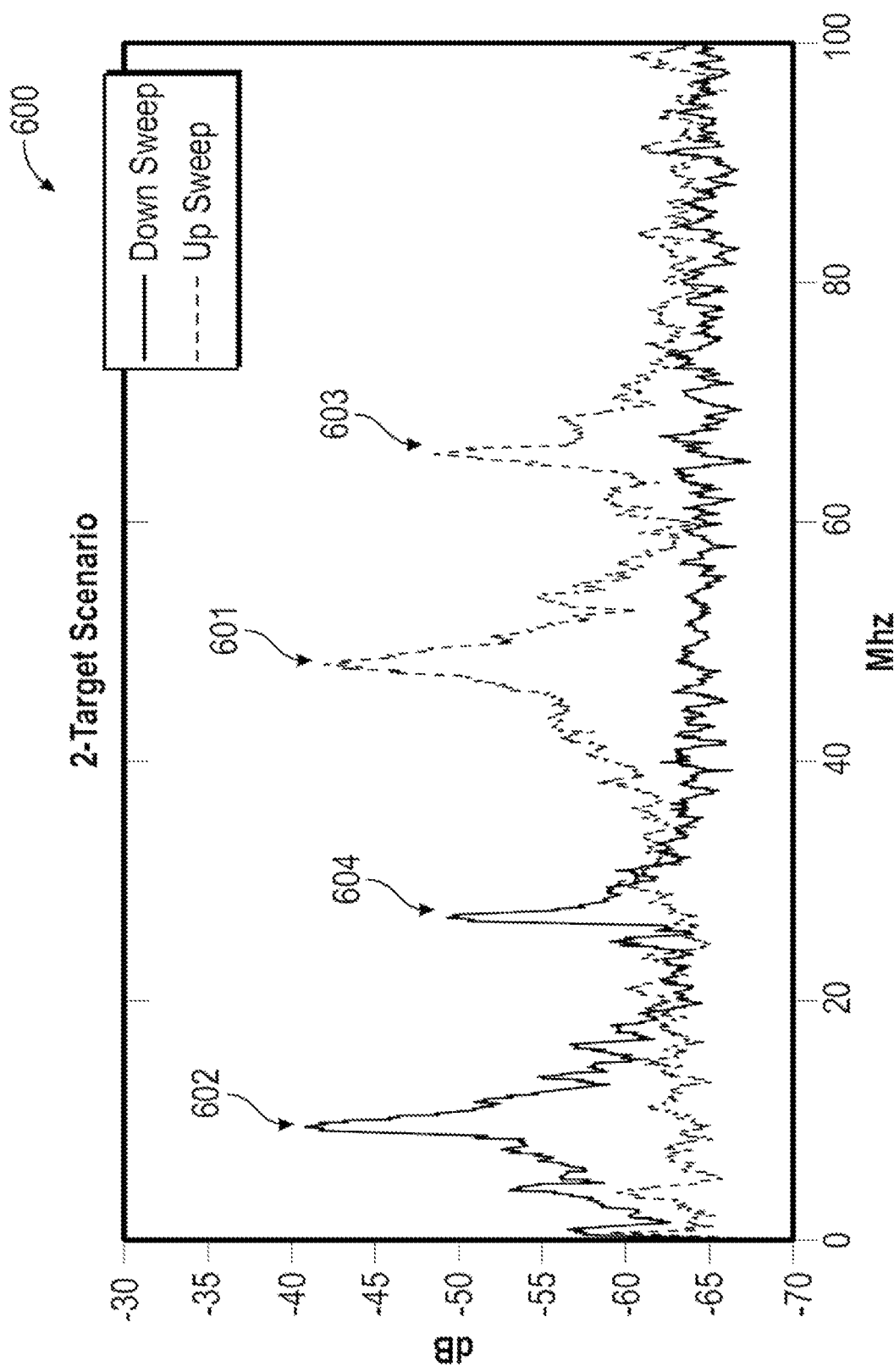
FIG. 6 is a detailed example of a magnitude-frequency diagram illustrating similar shapes of peaks for a target used for peak association according to the present disclosure.

As depicted in FIG. 5, from two targets in the field of view of the LIDAR system, the signal processing unit 112 may identify several peak frequencies (e.g., peak frequencies of the subbands 319). For example, the signal processing unit 112 may identify a first down-sweep target peak 520A and a second down-sweep target peak 520B from the down-sweep signal and a first up-sweep target peak 525A and a second up-sweep target peak 525B from the up-sweep signal. Accordingly, the signal processing unit 112 may match the peaks in one of several ways in which the peaks could possibly be matched. To correctly associate the pairs together, the signal processing unit 112 may calculate several metrics for each peak and each peak pair possibility, as described in more detail below with respect to FIGS. 7-9. For example, as illustrated by FIG. 6, the peaks corresponding to the same target may have very similar shapes and thus, the signal processing unit 112 may calculate a metric associated with peak shape and use the calculated metric to optimally associate the peaks of a target. However, as discussed below, the signal processing unit 112 may calculate many other metrics for the peaks and use the metrics to perform peak association. As depicted, the signal processing unit 112 may identify a first target pair 505 including the first down-sweep target peak 520A and the first up-sweep target peak 525A based on the calculated metrics (e.g., peak shape, intensity, etc.). Additionally, the signal processing unit 112 may identify a second target pair 510 including the second down-sweep target peak 520B and the second up-sweep target peak 525B based on the calculated metrics (e.g., peak shape, intensity, etc.).

FIG. 6 is a magnitude versus frequency diagram 600 illustrating up-sweep and down-sweep signal peaks for multiple targets. As illustrated, the subband frequency distribution (e.g., subbands 319) is associated with a respective up-sweep signal and down-sweep signal each having a corresponding peak associated with each target. The peaks of the up-sweep signal and the down-sweep signal that correspond to the same target may have similar properties. For instance, the first peak of the up-sweep 601 and the first peak of the down-sweep 602 have similar properties, including shape and intensity, and are offset from one another in the frequency spectrum. Similarly, the second peak of the upsweep 603 and the second peak of the down-sweep 604 have common properties, such as shape and intensity with a similar frequency offset. Accordingly, a signal processing system (e.g., signal processing unit 112 of FIG. 1) may generate metrics for detected peaks based on characteristics of the peaks to be used to optimally perform a peak association.

Figure 7:
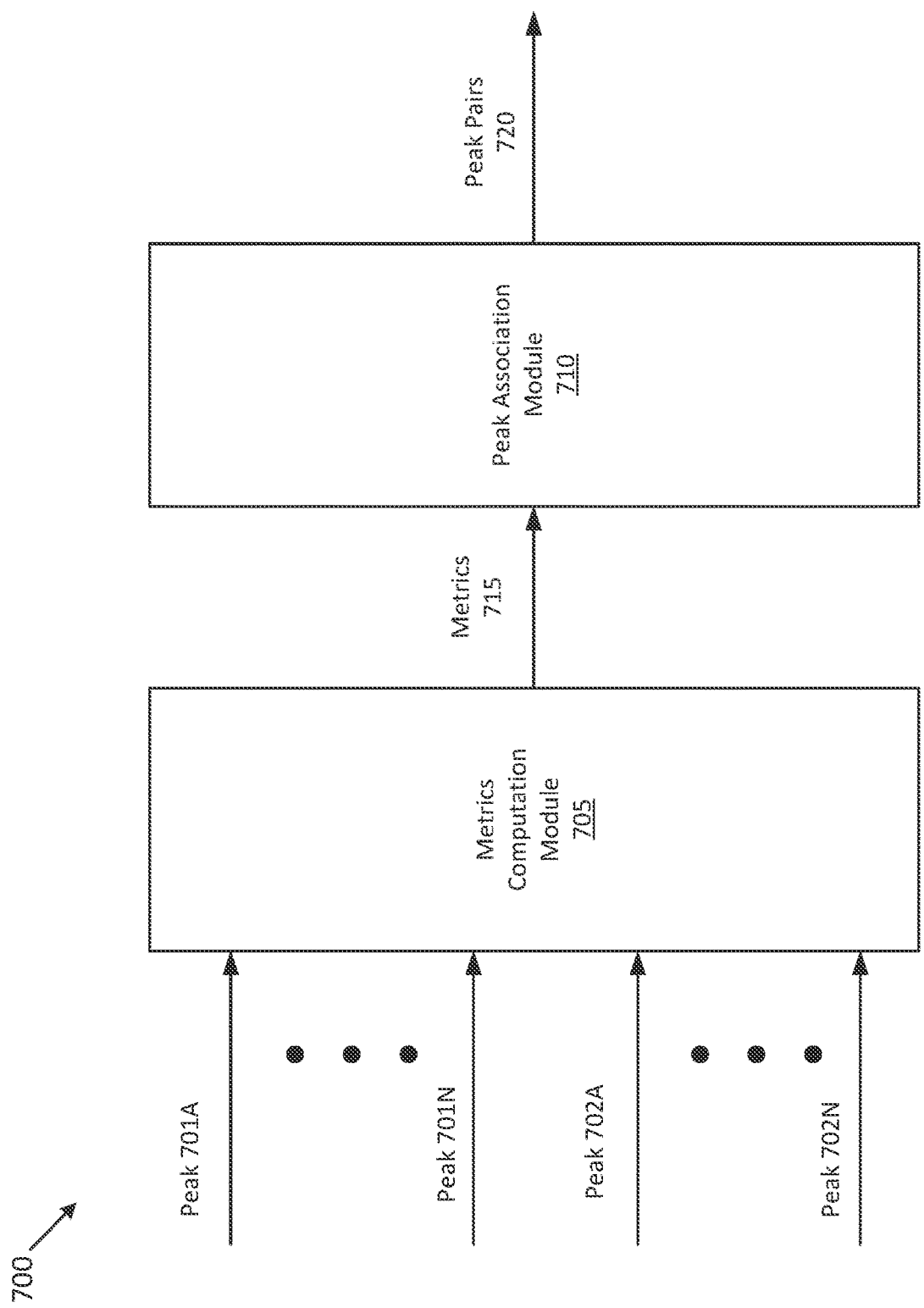
FIG. 7 is a block diagram of an example signal processing system for peak association using computed metrics of each peak according to the present disclosure.

FIG. 7 depicts a peak association system 700 for peak association optimization. Peak association system 700 may be included in signal processing system 112 of FIG. 1 and may be the same or similar to peak search module 406 of FIG. 4. In one embodiment, a metrics computation module 705 receives N number of up-sweep peaks (peaks 701A-N) and N number of down-sweep peaks (peaks 702A-N), where N is a positive non-zero integer. The metrics computation module 705 may also receive several frequency bins proximate to the peaks 701A-N and 702A-N. In some embodiments, the metrics computation module 705 then generates one or more metrics 715 for each of the peaks 701A-N and 702A-N and peak pair combinations of the peaks 701A-N and 702A-N. The metrics computation module 705 may generate the one or more metrics 715 based on properties of the peaks 701A-N and 702A-N as well as the frequency bins that are proximate to the peaks. For example, the metrics computation module 705 may generate metrics 715 for the peaks 701A-N and 702A-N and possible peak pairs based on, but not limited to, the shape of the peaks, intensity of the peaks, peak width, raw frequencies of the peaks, SNR, reflectivity, ego velocity of the LIDAR system, and/or any other characteristics of the target, the peaks, and the LIDAR system. Accordingly, the metrics computation module 705 may generate several metrics 715 for each of the N×N number of possible peak pairs.

In one embodiment, the metrics calculation module 705 may take each of the individually calculated metrics 715 and combine them into a combined metric. For example, the metrics calculation module 705 may generate a weighted sum of the metrics 715 for each of the peaks or possible peak pairs. Each of the metrics 715 may be weighted in a manner corresponding to the associated relevance and or confidence of the metric. For example, metrics such as shape of the peak which provide for a high confidence for correct association may be weighted more than other metrics providing lower confidence scores. It should be noted that the individual metrics may be combined in any combination and in any manner to provide for a combined metric. In one example, the weights for each of the metrics may be static. In another example, the weights may be determined dynamically based on feedback from the peak association algorithm. In one embodiment, the weights may be determined by a machine learning model to optimize the performance of the peak association algorithm.

The metrics calculation module 705 may then provide the one or more generated metrics 715 to peak association module 710. The peak association module 710 may optimize peak association based on an algorithm using the one or more metrics 715 as an input. In one example, the peak association module 710 may perform a greedy algorithm by first selecting the peak pair that has the highest correlation based on the metrics 715, associate and remove that pair and then continue with the next highest correlation. In another example, a more complex algorithm may be performed (e.g., a Hungarian algorithm) to find the overall cost optimization based on the peak metrics 715.

In some embodiments, the number of up-sweep peaks and down-sweep peaks may differ. In such a case, the metrics computation module 705 may generate N×M number of metrics 715, wherein N is the number of up-sweep peaks and M is the number of down-sweep peaks, or vice versa. In some embodiments, the peak association module 710 may perform multiple algorithms to account for situations in which the number of peaks from the up-sweep is not the same as the number of peaks from the down-sweep. For example, the peak association module 710 may perform a first peak association algorithm when the number of peaks from the up-sweep and down-sweep are the same. However, two possible scenarios may occur in which the number of peaks are not the same. First, a target may be missed by one of the sweeps and therefore there is a mismatch due to the missed detection. In this case, the peak association module 710 may perform a second peak association algorithm to match all peaks with a pair except for a subset of the peaks (i.e., not all peaks are forced to match). In the second scenario, a false detection may occur causing an extra peak associated with the up-peak or the down-peak. In this case, the peak association module 710 may perform a third peak association algorithm to match all the peaks with a pair except for the extra, false alarm peak (i.e., weak peaks that are potential false alarm peaks could be excluded from the peak association algorithm).

Figure 8:
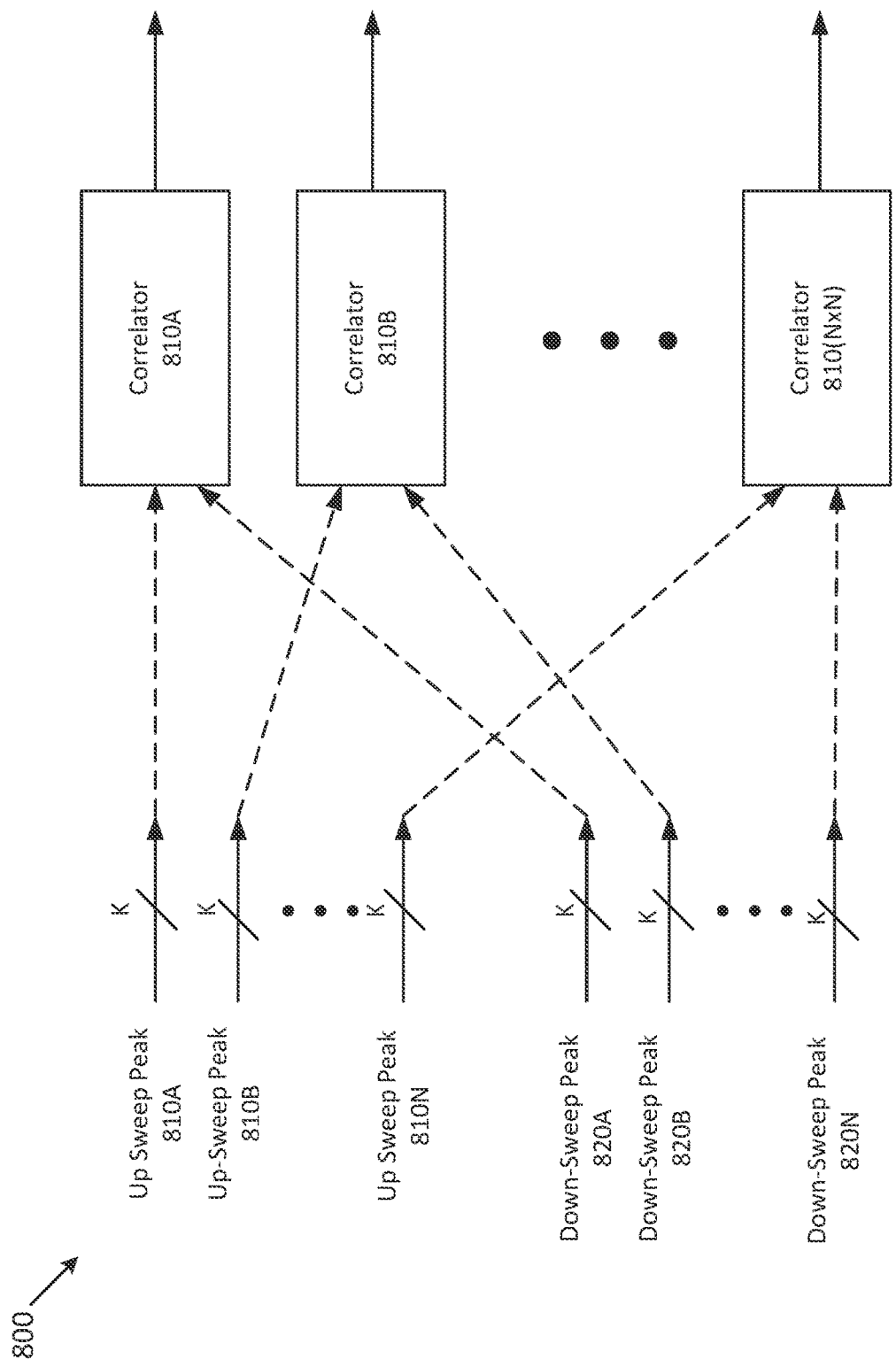
FIG. 8 is a block diagram illustrating correlator metric generation according to the present disclosure.

FIG. 8 is an example correlator 800 for determining a correlation between the shapes of the peaks (e.g., cross-correlation) as performed by embodiments of the present disclosure. In some embodiments, the correlator 800 may be included in signal processing unit 112 of FIG. 1. In some embodiments, the correlator may be included in metrics computation module 705 of FIG. 7. As illustrated, each of the up-sweep peaks 810A-N may be input into a correlator with each of the down-sweep peaks 820A-N to generate a correlator value for each of the possible combinations of up-sweep and down-sweep peak pairs. Input into each correlator 810A-(N×N) may be K number of samples (i.e., frequency bins) around each of the input peaks, where K is a positive, non-negative integer. In one example, the correlator may perform a convolution of the two peaks and K samples that are input into the correlator 810A-(N×N) and produce 2K+1 number of correlation samples. The correlator 810A-(N×N) may then select the maximum correlation sample from the 2K+1 correlation output as the output of the correlator 810A-(N×N). Accordingly, a maximum correlation of each of the possible peak pairs is generated which can then be provided to the peak association module 710 described above in FIG. 7.

Figure 9:
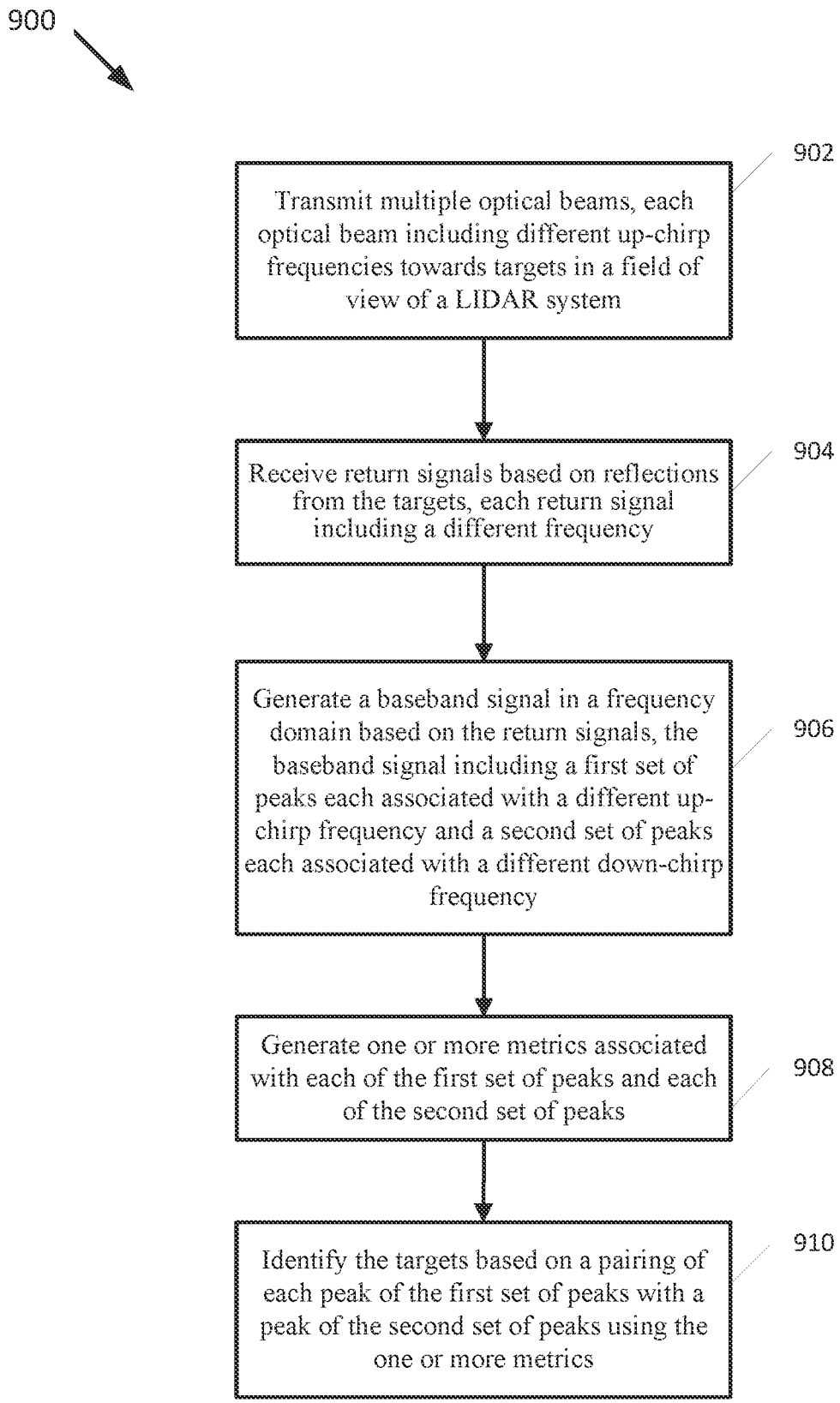
FIG. 9 is a flowchart illustrating a method for signal peak association according to the present disclosure.

FIG. 9 is a flowchart illustrating a method 900 in a LIDAR system, such as LIDAR system 100 or LIDAR system 300, of associating peaks in multi-target scenarios in a LIDAR system.

Method 900 begins at operation 902, an optical scanner (e.g., optical scanner 301) transmits multiple optical beams, each optical beam including different up-chirp frequencies towards targets in a field of view of a LIDAR system. At operation 904, the optical scanner (e.g., optical scanner 301) receives return signals based on reflections from the targets, each return signal including a different frequency.

At operation 906, an optical processing system (e.g., optical processing system 302) generates a baseband signal in a frequency domain based on the return signals, the baseband signal including a first set of peaks each associated with a different up-chirp frequency and a second set of peaks each associated with a different down-chirp frequency.

At operation 908, a metrics computation module (e.g., metrics computation module 705) of a signal processing system (e.g., signal processing system 303) generates one or more metrics associated with each of the first set of peaks and each of the second set of peaks. In some embodiments, the one or more metrics include similar computed peak shapes between each peak of the first plurality of peaks and the second plurality of peaks. In some embodiments, the one or metrics may include a correlation between each of the up-sweep peaks and each of the down-sweep peaks based on a similarity between peak shapes, peak intensity, peak widths, or any other characteristics of the peaks. The one or more metrics may also include external metrics such as ego/sensor velocity. In one example, the similarity between peak shapes may be determined by applying a correlator to generate a correlation value for each of the first plurality of peaks compared with each of the second plurality of peaks.

In some embodiments, the metrics computation module (e.g., metrics computation module 705) may combine the one or more metrics for each the first plurality of peaks and the second plurality of peaks into a combined metric and perform the peak association based on the combined metric for each of the first plurality of peaks and the second plurality of peaks. For example, the metrics computation module (e.g., metrics computation module 705) may weight each of the one or more metrics to generate weighted metrics and sum one or more of the weighted metrics to generate a weighted sum of the one or more metrics.

At operation 910, a peak association module (e.g., peak association module 710) identifies the targets based on a pairing of each peak of the first set of peaks with a peak of the second set of peaks using the one or more metrics. To identify the targets from the first and second set of peaks, the peak association module (e.g., peak association module 710) may perform an optimization algorithm to minimize a cost function corresponding to a difference between matched peaks. In one example, the peak association module (e.g., peak association module 710) may identify a plurality of neighboring data points of each of the first plurality of peaks and the second plurality of peaks and perform the peak association further based on the plurality of neighboring data points of each of the first plurality of peaks and the second plurality of peaks. Each of the plurality of neighboring data points may include one or more of data points neighboring the peaks in an azimuthal space, an elevation space, a three-dimensional space, or in a temporal space.

The peak association module (e.g., peak association module 710) may further determine that a first number of the first plurality of peaks is different from a second number of the second plurality of peaks (e.g., missing peaks or extra peak detection). In some embodiments, the peak association module (e.g., peak association module 710) may perform variants of a peak association algorithm to account for missing or extra peaks. For example, in response to determining that the number of peaks in the first plurality of peaks does not match the number of peaks in the second set of peaks, the peak association module (e.g., peak association module 710) may perform the peak association based on a first algorithm associated with an extra peak being detected (e.g., extra peak detected by either the up-chirp or the down-chirp). In another example, in response to determining that a target detection has been missed by either the up-chirp or down-chirp, the peak association module (e.g., peak association module 710) may perform the peak association based on a second algorithm for missed detections.

Figure 10:
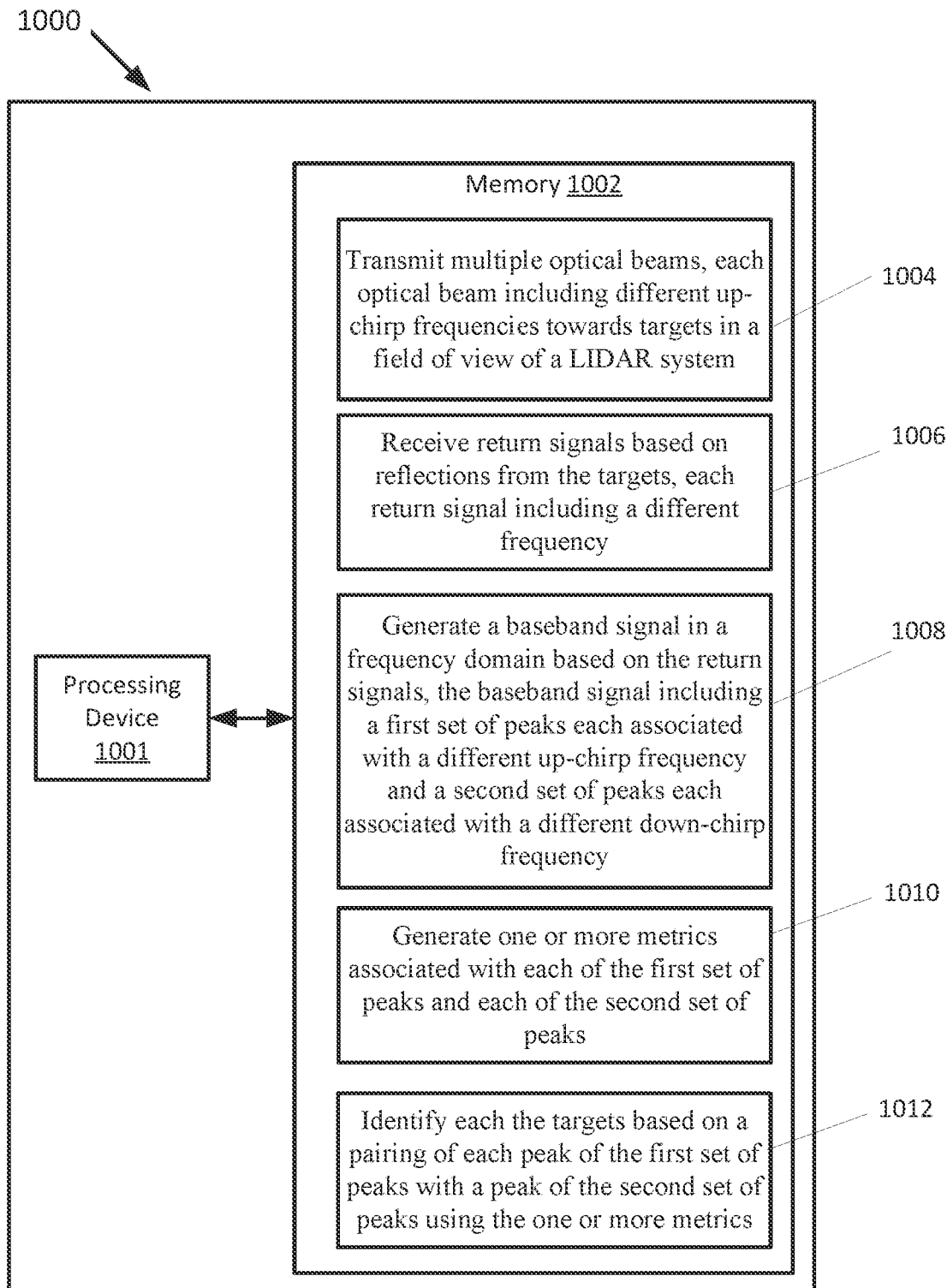
FIG. 10 is a block diagram of an example signal processing system according to the present disclosure.

FIG. 10 is a block diagram of a processing system 1000 (e.g., similar to signal processing system 303 illustrated and described above with respect to FIG. 4) in a LIDAR system such as LIDAR system 100 or LIDAR system 300. Processing system 1000 includes a processing device 1001, which may be any type of general purpose processing device or special purpose processing device designed for use in the LIDAR system (also see, e.g., signal processing unit 112 in FIG. 1). Processing device 1001 is coupled with a memory 1002, which can be any type of non-transitory computer-readable medium (e.g., RAM, ROM, PROM, EPROM, EEPROM, flash memory, magnetic disk memory or optical disk memory) containing instructions that, when executed by processing device 1001 in the LIDAR system, cause the LIDAR system to perform the method described herein. In particular, memory 1002 includes instructions 1004 to transmit multiple optical beams, each optical beam including different up-chirp frequencies towards targets in a field of view of a LIDAR system; instruction 1006 to receive return signals based on reflections from the targets, each return signal including a different frequency; instruction 1008 to generate a baseband signal in a frequency domain based on the return signals, the baseband signal including a first set of peaks each associated with a different up-chirp frequency and a second set of peaks each associated with a different down-chirp frequency; instruction 1010 to generate one or more metrics associated with each of the first set of peaks and each of the second set of peaks; and instruction 1012 to identify each the targets based on a pairing of each peak of the first set of peaks with a peak of the second set of peaks using the one or more metrics.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   transmitting a plurality of optical beams each comprising different frequency chirps towards a plurality of targets in a field of view of a light detection and ranging (LIDAR) system;
   receiving a plurality of return signals based on reflections from the plurality of targets, wherein each return signal from the plurality of return signals comprises a different frequency;
   generating a baseband signal in a frequency domain based on the plurality of return signals, the baseband signal comprising a first plurality of peaks each associated with a different up-chirp frequency and a second plurality of peaks each associated with a different down-chirp frequency;
   generating, by a processor, one or more metrics associated with each of the first plurality of peaks and each of the second plurality of peaks, wherein the one or more metrics comprise a similarity of peak shapes determined by a correlator based on comparing a plurality of frequency bins associated with each of the first plurality of peaks with a plurality of frequency bins of each of the second plurality of peaks;

pairing each peak of the first plurality of peaks with a peak of the second plurality of peaks using the similarity of peak shapes, wherein peaks with a maximum shape similarity based on an output of the correlator are paired to produce a pairing; and identifying, by the processor, the plurality of targets based on the pairing.

2. The method of claim 1, wherein the one or more metrics further comprise at least one of peak intensity, peak width, ego-velocity, and raw peak frequencies.

3. The method of claim 1, further comprising:

combining the one or more metrics for each the first plurality of peaks and the second plurality of peaks into a combined metric; and identifying the plurality of targets from the plurality of targets based on the combined metric for each of the first plurality of peaks and the second plurality of peaks.

4. The method of claim 3, wherein combining the one or more metrics into a combined metric comprises:

weighting each of the one or more metrics to generate weighted metrics; and summing one or more of the weighted metrics to generate a weighted sum of the one or more metrics.

5. The method of claim 1, wherein identifying the plurality of targets comprises performing an optimization algorithm to minimize a cost function associated with the pairing of each of the first plurality of peaks and the second plurality of peaks, the cost function corresponding to a sum of the one or more metrics for the pairing of each of the first plurality of peaks and the second plurality of peaks.

6. The method of claim 1, further comprising:

identifying a plurality of neighboring data points of each of the first plurality of peaks and the second plurality of peaks; and identifying the plurality of targets further based on the plurality of neighboring data points of each of the first plurality of peaks and the second plurality of peaks.

7. The method of claim 6, wherein each of the plurality of neighboring data points comprise one or more of data points neighboring each of the first plurality of peaks and the second plurality of peaks in an azimuthal space, an elevation space, a three-dimensional space, or in a temporal space.

8. The method of claim 1, further comprising:

determining that a first number of peaks in the first plurality of peaks is different from a second number of peaks in the second plurality of peaks; and in response to determining that the first number of peaks does not match the second number of peaks:

identifying the plurality of targets based on an extra peak being detected by either the up-chirp frequencies or the down-chirp frequencies; or identifying the plurality of targets based on a missed detection of either the up-chirp frequencies or the down-chirp frequencies.

9. A light detection and ranging (LIDAR) system, comprising:

an optical scanner to transmit a plurality of optical beams each comprising different frequency chirps toward a plurality of targets in a field of view of the LIDAR system and receive a plurality of return signals from reflections of the plurality of optical beams from the plurality of targets wherein each return signal from the plurality of return signals comprises a different frequency;

an optical processing system coupled to the optical scanner to generate an electrical signal from the plurality of return signals, the electrical signal comprising frequencies corresponding to LIDAR target ranges; and a signal processing system coupled to the optical processing system, comprising:

a processing device; and a memory to store instructions that, when executed by the processing device, cause the LIDAR system to:

generate a baseband signal in a frequency domain based on the electrical signal generate from the plurality of return signals, the baseband signal comprising a first plurality of peaks each associated with a different up-chirp frequency and a second plurality of peaks each associated with a different down-chirp frequency;

generate one or more metrics associated with each of the first plurality of peaks and each of the second plurality of peaks of the baseband signal, wherein the one or more metrics comprise a similarity of peak shapes determined by a correlator based on comparing a plurality of frequency bins associated with each of the first plurality of peaks with a plurality of frequency bins of each of the second plurality of peaks;

pair each peak of the first plurality of peaks with a peak of the second plurality of peaks using the similarity of peak shapes, wherein peaks with a maximum shape similarity based on an output of the correlator are paired to produce a pairing; and identify the plurality of targets based on the pairing.

10. The system of claim 9, wherein the one or more metrics further comprise at least one of peak intensity, peak width, ego-velocity, and raw peak frequencies.

11. The system of claim 9, wherein the processing device is further to:

combine the one or more metrics for each the first plurality of peaks and the second plurality of peaks into a combined metric; and identify the plurality of targets from the plurality of targets based on the combined metric for each of the first plurality of peaks and the second plurality of peaks.

12. The system of claim 11, wherein to combine the one or more metrics into a combined metric the processing device is to:

weight each of the one or more metrics to generate weighted metrics; and sum one or more of the weighted metrics to generate a weighted sum of the one or more metrics.

13. The system of claim 9, wherein to identify the plurality of targets, the processing device is to:

perform an optimization algorithm to minimize a cost function associated with the pairing of each the first plurality of peaks and the second plurality of peaks, the cost function corresponding to a sum of the one or more metrics for the pairing of each of the first plurality of peaks and the second plurality of peaks.

14. A light detection and ranging (LIDAR) system, comprising:

an optical scanner to transmit a plurality of optical beams each comprising different frequency chirps toward one or more targets in a field of view of the LIDAR system and receive a plurality of return signals from reflections of the plurality of optical beams from the one or more targets wherein each return signal from the plurality of return signals comprises a different frequency;

an optical processing system coupled to the optical scanner to generate an electrical signal from the plurality of return signals, the electrical signal comprising frequencies corresponding to LIDAR target ranges; and a signal processing system coupled to the optical processing system, comprising:
- a processing device; and
- a memory to store instructions that, when executed by the processing device, cause the LIDAR system to:
  - identify a first plurality of peaks of the electrical signal, each peak of the first plurality of peaks being associated with a different up-chirp frequency, and a second plurality of peaks of the electrical signal, each peak of the second plurality of peaks being associated with a different down-chirp frequency;
  - determine one or more peak metrics for each of the first plurality of peaks and the second plurality of peaks, wherein the one or more peak metrics comprise a similarity of peak shapes determined by a correlator based on comparing a plurality of frequency bins associated with each of the first plurality of peaks with a plurality of frequency bins of each of the second plurality of peaks;
  - generate a plurality of peak pairs by associating each peak of the first plurality of peaks with a peak of the second plurality of peaks based on the one or more peak metrics wherein peaks with a maximum shape similarity based on an output of the correlator are paired; and
  - identify the one or more targets based on the plurality of peak pairs.

15. The LIDAR system of claim 14, wherein the one or more peak metrics comprises at least one of peak shape, peak intensity, peak width, ego-velocity, and raw peak frequencies.

16. The LIDAR system of claim 15, wherein to generate the plurality of peak pairs the processing device is to:
- combine the one or more peak metrics for each peak of the first plurality of peaks and the second plurality of peaks into a combined metric; and
- associate each peak of the first plurality of peaks with a peak of the second plurality of peaks based on the combined metric for each peak of the first plurality of peaks and the second plurality of peaks.

17. The method of claim 1, wherein the correlator performs a convolution of the plurality of frequency bins associated with each of the first plurality of peaks and the plurality of frequency bins of each of the second plurality of peaks.

18. The LIDAR system of claim 9, wherein the correlator performs a convolution of the plurality of frequency bins associated with each of the first plurality of peaks and the plurality of frequency bins of each of the second plurality of peaks.

19. The LIDAR system of claim 14, wherein the correlator performs a convolution of the plurality of frequency bins associated with each of the first plurality of peaks and the plurality of frequency bins of each of the second plurality of peaks.

* * * * *